Patented Nov. 1, 1932

1,886,293

UNITED STATES PATENT OFFICE

ELLIOTT MORRILL, OF CHICAGO, ILLINOIS

TREATING OILS AND COMPOSITION THEREFOR

No Drawing. Application filed February 8, 1929. Serial No. 338,615.

The present invention relates to the breaking of oil emulsions, especially in fuel oils.

It is a well-known fact that fuel, or furnace oils contain varying amounts of water, (usually containing salts), and various amounts of suspended carbon, sulphur, and asphaltic and resinous matter. These substances combine with the oil to form viscous and heavy emulsions, which are known as "bottom settling", or sludge. On burning off a storage tank containing fuel oils, these emulsions will cause clogging at the separators in the lines, and at the burner heads, with consequently a considerable loss of time in obtaining the necessary heats, irregularity and poor control, as well as loss of oil value.

A variety of different chemicals, or mixtures thereof, can be used for the purpose of breaking these emulsions, which enable the water and salt solutions, and other chemicals suspended in the emulsions to settle down and thereby leave the oil clean and with the proper fluidity so that it does not cause the trouble produced by emulsions.

Some of the compositions on the market are limited in application in that they are commercially ineffective on certain types of oils. Such a composition must be effective in small quantities for large volumes of oil so that there is an economic advantage in using it. Paraffin base oils may be treated economically with a composition which will not be economically applied to asphaltic base oils.

The various chemicals and compositions which have heretofore been employed have failed as a practical proposition for the reason that upon standing they absorb moisture from the air and in this way they lose their property of absorbing the water from the oil, and thereby fail to break the emulsions which is the purpose for which they are intended.

One object of the present invention is to provide a composition which is stable in bulk under ordinary atmospheric conditions, so that it will keep for a long period of time without being rendered ineffective or inefficient by absorbing moisture from the air.

Another object of the invention is the provision of a composition that is effective on a variety of different oils.

Still another object of the invention is the provision of a composition which not only breaks emulsions but which cleans the lines, tanks, etc., of incrustations and sludge deposited thereon by prior use of untreated oils.

A more specific object of the invention is the protection of a hygroscopic component of the composition with a protecting compound which is effective as a protection against atmospheric injury to the composition and which may be harmless or even advantageous when the composition functions in the oil.

Various other and ancillary objects and advantages of the invention will become apparent from the following description of the invention exemplified in the illustrative compositions hereinafter given.

The essential component of the compound has the function of breaking the emulsion. Components for this purpose are well known and in general include alkali or an alkaline reacting compound such as caustic soda, caustic potash or lime. Such compounds cut the oil, combine with or absorb water and certain sulphur ingredients or free sulphur, and resinous matter and other impurities.

I prefer to employ a hydrocarbon type of compound in combination with the emulsion breaking agent. It acts mechanically as a diluent and forms a suitable base for breaking up the emulsion. Solid hydrocarbons like anthracene, naphthalene, phenanthrene, and the similar compounds are very suitable since they may be ground into the alkali or emulsion breaker. These hydrocarbons are promoters of good combustion and have a fuel value. The hydrocarbon is not essential but very desirable for practical reasons.

The hydrocarbons above referred to are somewhat volatile, and the alkalies described readily absorb water from the air. When used together the hydrocarbon and the alkali are intimately mixed by grinding to a fine powder. The powder is readily reactive to absorb materials, for example moisture, from the air, and to volatilize the hydrocarbon. I aim to protect the mass from such reactions by coating the particles with a protecting agent. In practice I employ one which is non-volatile and non-absorbent as to atmospheric constituents. I also use a protecting agent which is soluble in the oil, so that it may liberate the protected ingredients for action.

As a protecting agent I have used a water-repellant compound best exemplified by a metallic soap, such as the oleates, stearates, linoleates of metals such as aluminum zinc and lead. The metallic soaps are not limited to these materials and various combinations of suitable metals and fatty acids are contemplated for the purpose described.

The following formulæ illustrate a number of suitable compositions embodying the present invention.

*Example 1*

| | Parts of |
|---|---|
| Naphthalene | 900 |
| Caustic soda | 90 |
| Aluminum oleate | 10 |

*Example 2*

| | Parts of |
|---|---|
| Anthracene | 750 |
| Caustic potash | 240 |
| Zinc stearate | 10 |

*Example 3*

| | Parts of |
|---|---|
| Phenanthrene | 400 |
| Anthracene | 200 |
| Naphthalene | 230 |
| Caustic potash | 90 |
| Caustic soda | 70 |
| Lime | 3 |
| Lead linoleate | 7 |

*Example 4*

| | Parts of |
|---|---|
| Naphthalene | 750 |
| Caustic soda | 180 |
| Aluminum stearate | 70 |

In preparing the compound the constituents are ground together and the metalic soaps exhibit their characteristic coating and protecting property in the resultant compound.

In use, one pound of compound is added to from 500 to 1500 gallons of oil depending upon the purity of the oil and the character of the oil. A rise of temperature may be noted as reaction occurs. Agitation hastens the process by increasing distribution. Without agitation the changing character of the oil caused by the separation of the broken emulsion aids in distributing the compound.

I have found that the compound continues to be effective under some conditions over long periods of time, especially when it is added directly to a sludge that is to be broken up. I have found it effective on oil-in-water emulsions as well as on water-in-oil emulsions.

I have also found that pipes, valves and other connections are cleansed of sludge deposits and incrustations formed by prior use of untreated oil. The combustion is improved, regularity of flow is established with consequently improved control, and the oil is better adapted to flowing and for handling especially in cold weather.

I have reason to believe that the metallic soaps dissolved in the oil aid materially in breaking the emulsions and in improving the combustion toward which they doubtlessly exert a catalytic effect because of their metalic content.

It is to be understood that I do not limit the invention to the illustrative examples given above and that I contemplate such other materials and compositions as may fall within the scope of the appended claims defining the invention.

I claim:

1. A composition of matter containing in intimate admixture naphthalene, caustic soda, and lead linoleate.

2. A composition of matter containing in intimate admixture caustic potash and zinc stearate.

3. A composition of matter containing in intimate admixture substantially 75% naphthalene, 18% caustic soda and 7% of aluminum stearate.

4. A process for breaking emulsions in low grade oils consisting in treating the oils with a small percentage of a composition of matter containing in intimate admixture a polynuclear aromatic hydrocarbon, an alkaline-reacting substance, and an oil soluble water-repellant substance.

5. A composition of matter which consists of a comminuted mixture of an alkali, a solid polynuclear aromatic hydrocarbon, and an oil-soluble water-repellant protective agent.

6. A composition of matter for breaking an emulsion of a hydrocarbon and for treating fuel oils and the like which contains in a comminuted mixture, a solid caustic alkali, a solid hydrocarbon from the group napthalene, anthracene and phenanthrene, and a metallic soap which is oil soluble.

In witness whereof, I have hereunto affixed my signature.

ELLIOTT MORRILL.